United States Patent [19]

Fujiki

[11] 4,383,001

[45] May 10, 1983

[54] MAGNETIC RECORDING MEDIUM

[75] Inventor: Kuniharu Fujiki, Yokohama, Japan

[73] Assignee: Victor Company of Japan, Limited, Yokohama, Japan

[21] Appl. No.: 223,088

[22] Filed: Jan. 7, 1981

[30] Foreign Application Priority Data

Jan. 11, 1980 [JP] Japan .................................. 55-1355

[51] Int. Cl.$^3$ ............................................. B32B 27/30
[52] U.S. Cl. .................................. 428/522; 428/695; 428/900
[58] Field of Search ................................ 427/127–132, 427/48; 428/900, 695, 522; 252/62.54

[56] References Cited

FOREIGN PATENT DOCUMENTS 2535448 2/1977 Fed. Rep. of Germany .

Primary Examiner—Bernard D. Pianalto

Attorney, Agent, or Firm—Lowe, King, Price & Becker

[57] ABSTRACT

A magnetic recording medium which comprises a support and a magnetic layer formed on the support and comprised of a magnetic powder dispersed in a binder and also of a lubricant. The lubricant contains at least an ester of a linear aliphatic acid having 14–18 carbon atoms and an alcohol of the general formula,

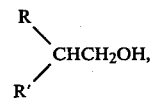

in which R and R' are independently a linear alkyl group having 5–10 carbon atoms. Preferably, an ester of a linear aliphatic acid having 14–18 carbon atoms and a linear or branched alcohol having 4–8 carbon atoms are also contained in the magnetic recording medium.

8 Claims, 1 Drawing Figure

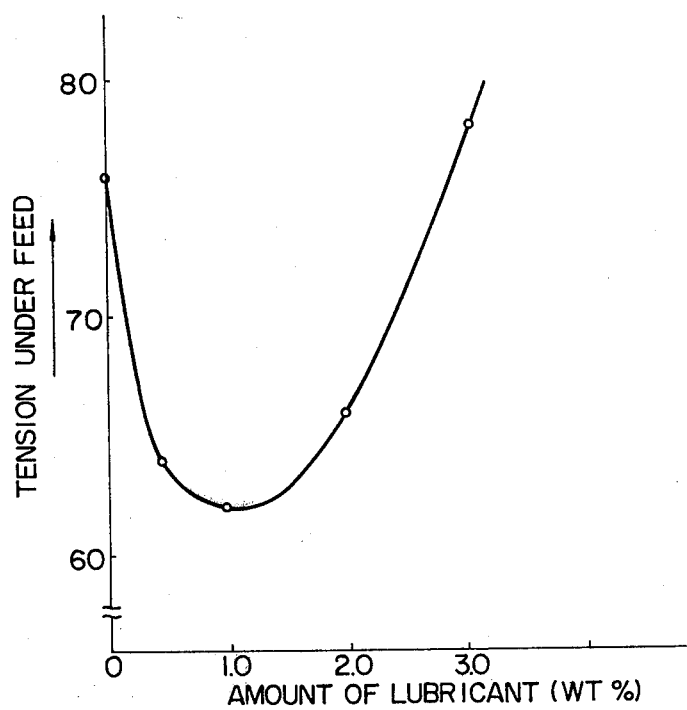

MAGNETIC RECORDING MEDIUM

BACKGROUND OF THE INVENTION

1. Field of the Invention

This invention relates to magnetic recording media and more particularly, to an improvement in magnetic recording layer media such as used for video tape recorders.

2. Description of the Prior Art

In recent years, there have been introduced onto the market video tape recorders of the long-time picture recording type. The recorders of this type are characterized by a magnetic head of narrow width which provide high recording density of the magnetic recording tape, thus imposing a great load on the magnetic tape.

Also, home video tape recorders have now come into wide use, and small-size, portable video tape recorders are increasing in number. The recording and reproducing system of these apparatus is a so-called helical capstan system using rotary magnetic heads by which a still picture can be reproduced. In the helical capstan system, when a pause mechanism is operated on recording or a still picture is reproduced, the magnetic head alone is allowed to rotate without feeding the magnetic tape, so that the magnetic tape is repeatedly scanned on the same portion. The portable video tape recorder of the just-mentioned type is often used under high temperature and high humidity conditions or at very low temperature in the open. Known magnetic recording tapes are rather unsatisfactory for use under these environmental or climatic conditions for still picture-reproducing or long-time reproducing purposes. Typical known magnetic recording tapes for the video tape recorder are obtained by applying onto a support such as polyester film or the like, magnetic paints which comprise magnetic powders, binders, carbon black and lubricants such as choresterin butyrate, silicone, graphite and molybdenum disulfide. When these tapes are subjected to long-time reproduction or still picture reproduction under high or low temperature conditions, there are encountered problems such as blooming and exudation of the lubricant used, head clogging, and abrasions produced on the tape coupled with rather poor magnetic characteristics.

SUMMARY OF THE INVENTION

It is an object of the present invention to provide magnetic recording media particularly useful for video tape recorders which overcome the disadvantages of the prior art media and can be conveniently used even under severe temperature and humidity conditions.

It is another object of the invention to provide magnetic recording media which show excellent wear resistance and thus run smoothly in operation and also minimize the likelihood of abrasive defects on the surface of the media on contact with magnetic recording and reproducing heads.

It is a further object of the invention to provide magnetic recording media which show excellent still picture reproduction and long-time reproduction characteristics.

It is a still further object of the invention to provide magnetic recording media which make use of a lubricant of a specific type as an essential component.

The above objects can be achieved by a magnetic recording medium which comprises a support and a magnetic recording layer formed on the support and comprised of a magnetic powder dispersed in a binder and of a lubricant which contains at least an ester of a linear aliphatic acid having 14–18 carbon atoms and an alcohol of the general formula,

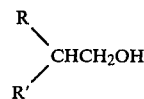

in which R and R' are independently a linear alkyl group having 5–10 carbon atoms, the ester being contained in an amount of about 0.2–2.5% by weight of the magnetic powder.

In a preferred aspect, the lubricant further comprises, in addition to the ester of the just-mentioned type, an ester of a linear aliphatic acid having 14 to 18 carbon atoms and a linear or branched monohydric alcohol having 4–8 carbon atoms.

In either case, other types of lubricants may be optionally contained in the lubricant component provided that the first-mentioned ester or a combination of the first- and second-mentioned esters, are essentially contained therein.

BRIEF DESCRIPTION OF THE FIGURE

The sole FIGURE accompanying the application is a graph showing tension exerted on a magnetic recording tape of the invention during its fast feed in relation to a variation in the amount of lubricant.

EMBODIMENTS OF THE INVENTION

As will be seen from the above, a prominent feature of the invention resides in use of a lubricant of a specific type incorporated in the magnetic layer of the medium.

It is essential in the practice of the invention that the lubricant contain at least an ester of a linear aliphatic acid having 14–18 carbon atoms and an alcohol of the general formula,

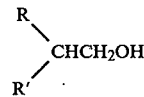

(in which R and R' are independently a linear alkyl group having 5–10 carbon atoms). The linear aliphatic acid having 14–18 carbon atoms is typically stearic acid. Aside from this, other acids such as myristic acid and palmitic acid are also usable. In general, commercially available stearic acid contains 10–35% of palmitic acid and myristic acid and such stearic acid is preferably used in the practice of the invention as well as pure stearic acid. Typical examples of alcohols of the above-indicated general formula include 2-pentylnonyl alcohol, 2-hexyldecyl alcohol, 2-heptylundecyl alcohol, 2-octyl dodecyl alcohol and the like.

The esters are produced from the linear aliphatic acid and these alcohols may be used singly or in combination. These esters are generally used in an amount of about 0.2 to 2.5 % by weight of the magnetic powder. This is because less amounts do not develop any significant effect and larger amounts are undersirable because exudation of the lubricant starts to occur but only in a slight degree when the amount reaches about 3 wt.%.

Preferably, the amount is in the range of about 1-1.5 % by weight of the magnetic powder.

The magnetic recording media using these esters show an excellent still picture reproduction characteristic at low and high temperature and also an excellent travelling performance.

These characteristics and performance can be further improved by incorporating in the magnetic recording layer another type of an ester of a linear aliphatic acid having 14~18 carbon atoms and a linear or branched monohydric alcohol having 4-8 carbon atoms. The linear monohydric alcohols are those represented by the general formula, $CH_3-(CH_2)_n-OH$ in which n is an integer of 3 to 7 and include, for example, n-butyl alcohol, n-amyl alcohol n-hexyl alcohol, n-heptyl alcohol and n-octyl alcohol. The branched monohydric alcohols are those represent by the general formula, $(CH_3)_2CH-(CH_2)_m-OH$ in which m is an integer of 1 to 5 and include isobutyl alcohol, isoamyl alcohol, isohexyl alcohol, isoheptyl alcohol, and isooctyl alcohol. The esters of these branched alcohols are preferably used in combination with those of the linear alcohols. The linear aliphatic acid is preferably stearic acid or commercial stearic acid mentioned hereinbefore. These esters are used in an amount of about 0.2 to 2.5 % by weight of the magnetic powder.

The lubricant to be used in the practice of the invention may optionally contain other types of lubricants provided that at least the first-mentioned ester is contained in the defined range. Examples of other types of lubricants include oils, fats, silicones and the like and are used generally in the range of about 1 % or below based on the weight of the magnetic powder.

The magnetic powders and binders useful for the purpose of the invention may be any of conventionally employed ones. For example, the magnetic powders include Fe, Fe-Co, $\gamma$-$Fe_2O_3$, Co-$\gamma$-$Fe_2O_3$, Co-$Fe_3O_4$ and the like. Preferable binders are two-component systems including polyisocyonate elastomers, polyesters, polyols, phenoxy resins, and the like.

The magnetic recording medium can be fabricated by any known techniques. For instance, magnetic powders, binders and lubricants are mixed in organic solvents and the resulting paint is applied onto a support such as a polyester film or sheet, followed by drying and calendering to obtain a magnetic recording medium.

The present invention will be particularly described in the following examples, which should not be construed as limiting the invention thereto.

EXAMPLE 1

100 parts by weight of Co-containing $\gamma$-$Fe_2O_3$, 20 parts by weight of a mixture of vinyl chloride-vinyl alcohol copolymer and polyurethane elastomer, 1 part by weight of lecithin, 1 part by weight of 2-ethylhexyl acid phosphate, 5 parts by weight of carbon black, 300 parts by weight of a mixed solvent of toluene, methyl ethyl ketone, and methyl isobutyl ketone, and less than 3 parts by weight of 2-pentylnonyl stearate ($C_{17}H_{35}$ $COOCH_2$ $CH(C_5H_{11})C_7H_{15}$) as a lubricant, were mixed in a sand mill for about 20 hours, to which was further added 5 parts by weight of polyisocyanate to obtain a magnetic paint. The paint was applied onto an about 14.5$\mu$ thick polyester film, dried and surface calendered. The resulting polyvinyl chloride-vinyl alcohol copolymer, polyurethane calendered film was held at about 60° C. for 24 hours to allow a curing reaction to proceed, after which it was cut to about ½ inch width to obtain a magnetic tape for a video tape recorder.

EXAMPLES 2-8

Example 1 was repeated using, instead of 2-pentylnonyl stearate, 2-hexyldecyl stearate ($C_{17}H_{35}COOCH_2CH$ $(C_6H_{13})C_8H_{17}$, ex. 2), 2-pentylundecyl stearate ($C_{17}H_{35}$ $COOCH_2CH(C_7H_{15})C_9H_{19}$, ex. 3), 2-octyldodecyl stearate ($C_{17}H_{35}COOCH_2CH(C_8H_{17})C_{10}H_{21}$, ex. 4), a mixture of 2-pentylnonyl stearate and 2-pentylnonyl palmitate in equal amounts (ex. 5), a mixture of 2-hexyldecyl stearate and n-butyl stearate ($C_{17}H_{35}COOCH_2-(CH_2)_2-CH_3$) in equal amounts (ex. 6), a mixture of 2-hexyldecyl stearate and isoamyl stearate ($C_{17}H_{35}COO(CH_2)_2CH(CH_3)_2$ in equal amounts (ex. 7), and a mixture of 2-hexyldecyl stearate, n-butyl stearate and isoamyl stearate in mixing ratios by weight of 4:3:3 (ex. 8), thereby obtaining the respective tapes.

COMPARATIVE EXAMPLES I-IV

Example 1 was repeated using, instead of 2-pentylnonyl stearate, 2-methylhexyl stearate (comp. ex. I), 2-ethylhexyl stearate (comp. ex. II), n-butyl stearate (comp. ex. III) and isoamyl stearate (comp. ex. IV), thereby obtaining the respective magnetic tapes.

The magnetic tapes made in the examples and comparative examples were each set in a magnetic recording and reproducing apparatus to check for picture quality and the degree of abrasive defects on the tape surface at the time of a still picture reproduction conducted a temperatures ranging from $-10°$ C. to 40° C. for 2 hours (hereinlater referred to as wear-resistant test A), and also at the time when a magnetic tape sample was held in a pause position where the same recording track was repeatedly scanned for 10 minutes and then still reproduced to observe a reproduced still picture (hereinlater referred to as wear-resistant test B). The results are shown in Table below. It will be noted that the wear-resistant tests A and B are evaluated as follows. 1 ... No defect 2 ... No defect but a slight degree of abrasion caused by the magnetic head 3 ... Slight degree of defect 4 ... Fair degree of defect 5 ... Considerable degree of defect Judging collectively, tapes evaluated as 1 or 2 are usable but those evaluated as 3, 4 or 5 are unfit for use.

TABLE

|  |  | Test A |  |  |  | Test B |
|---|---|---|---|---|---|---|
|  |  | −10° C. | 5° C. | 20° C. | 40° C. |  |
| Example | 1 | 3 | 1 | 1 | 2 | 1 |
|  | 2 | 3 | 2 | 1 | 1 | 1 |
|  | 3 | 3 | 2 | 1 | 1 | 1 |
|  | 4 | 3 | 2 | 1 | 1 | 1 |
|  | 5 | 3 | 2 | 1 | 1 | 1 |
|  | 6 | 2 | 1 | 1 | 1 | 1 |
|  | 7 | 1 | 1 | 1 | 1 | 1 |
|  | 8 | 2 | 1 | 1 | 1 | 1 |
| Comparative | I | 4 | 3 | 1 | 4 | 4 |
| Example | II | 4 | 2 | 1 | 4 | 3 |
|  | III | 5 | 3 | 1 | 2 | 1 |
|  | IV | 2 | 1 | 1 | 2 | 2 |

Note:
The amount of each lubricant is 1% by weight of the magnetic powder.

From these results, it will be seen that use of esters of the linear aliphatic acid having 14-18 atoms and alcohols of the general formula,

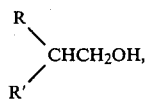

(in which R and R' are, respectively, a linear alkyl group having 5–10 carbon atoms) as a lubricant, is very effective in the still picture reproduction at high and low temperatures.

In addition, when these esters are used in combination with an ester of a linear aliphatic acid having 14–18 carbon atoms and a linear or branched alcohol having 4–8 carbon atoms, especially a linear alcohol or mixture of the linear alcohol and branched alcohol, the wear resistance in the still picture reproduction under low and high temperature conditions are more improved (see examples 6 to 8). Further, when each tape was subjected to a fast feed in the recording and reproducing system to check its travelling performance, it was found that the magnetic tapes of the invention were excellent.

Similar results were obtained when the types of magnetic powder and binder were changed, revealing that the superiority of the magnetic tapes of the invention was due to the effect of the lubricants of the specific type used in the present invention.

Then, the magnetic tapes of the present invention were subjected to a measurement of a tension under feed to determine their lubricating tendency. The tension of a typical magnetic tape of Example 1 is shown in the sole figure in relation to an amount of the lubricant, from which it will be understood that the amount of the lubricant ranging about 0.2 to 2.5 % of the magnetic powder is also effective in this respect. Similar results are obtained when the magnetic tapes obtained in other examples are subjected to such a measurement.

What is claimed is:

1. A magnetic recording medium comprising a support and a magnetic recording layer formed on said support, said layer comprising a magnetic powder dispersed in a binder and a lubricant which contains at least an ester of a linear aliphatic acid having 14–18 carbon atoms and a monohydric alcohol of the general formula,

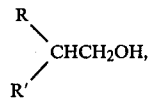

in which R and R' are independently a linear alkyl group having 5–10 carbon atoms, said ester being contained in an amount of about 0.2 to 2.5 % by weight of the magnetic powder.

2. A magnetic recording medium according to claim 1, wherein said aliphatic acid is stearic acid.

3. A magnetic recording medium according to claim 1, wherein said aliphatic acid is a mixture of stearic acid, palmitic acid and myristic acid.

4. A magnetic recording medium according to claim 1, further comprising an ester of a linear aliphatic acid having 14–18 carbon atoms and a linear or branched monohydric alcohol having 4–8 carbon atoms.

5. A magnetic recording medium according to claim 4, wherein the last-mentioned linear aliphatic acid is stearic acid.

6. A magnetic recording medium according to claim 4, wherein the last-mentioned monohydric alcohol is one which is expressed by the general formula, $CH_3-(CH_2)_n-OH$ in which n is an integer of 3–7.

7. A magnetic recording medium according to claim 4, wherein the last-mentioned monohydric alcohol is one which is expressed by the general formula, $(CH_3)_2CH-(CH_2)_m-OH$, in which m is an integer of 1–5.

8. A magnetic recording medium according to claim 4, wherein the last-mentioned ester is a mixture of stearates of an alcohol of the general formula, $CH_3-(CH_2)_n-OH$ wherein n is an integer of 3–7 and an alcohol of the general formula, $(CH_3)_2CH-(CH_2)_m-OH$ wherein m is an integer of 1–5.

* * * * *